Figure 1:
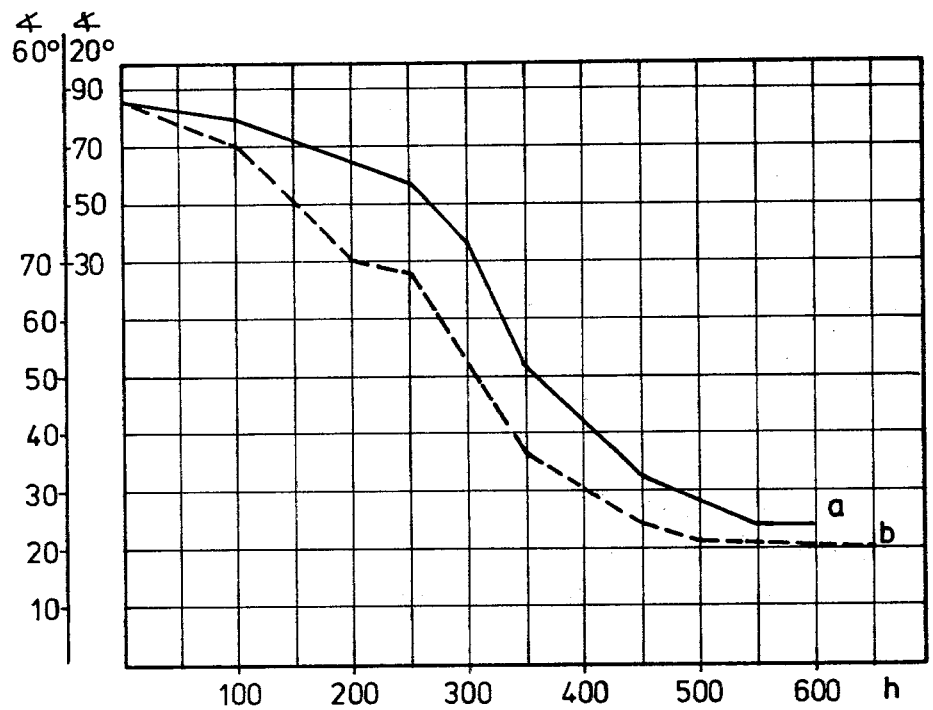

United States Patent [19]

Rottmaier et al.

[11] 4,288,569
[45] Sep. 8, 1981

[54] POWER LACQUER BINDERS AND PROCESS FOR THE PREPARATION THEREOF

[75] Inventors: Ludwig Rottmaier, Odenthal; Rudolf Merten, Leverkusen; Rolf Dhein; Hans J. Kreuder, both of Krefeld, all of Fed. Rep. of Germany

[73] Assignee: Bayer Aktiengesellschaft, Fed. Rep. of Germany

[21] Appl. No.: 182,667

[22] Filed: Aug. 29, 1980

[30] Foreign Application Priority Data

Sep. 1, 1979 [DE] Fed. Rep. of Germany ....... 2935446

[51] Int. Cl.$^3$ .............................................. C08L 63/00
[52] U.S. Cl. .................................... 525/113; 525/438; 525/934; 260/40 R; 260/42.28; 428/418
[58] Field of Search ................................. 525/113, 438

[56] References Cited

U.S. PATENT DOCUMENTS

| | | | |
|---|---|---|---|
| 3,836,604 | 9/1974 | Hagemann | 525/281 |
| 3,900,435 | 8/1975 | Wingler | 260/17 |
| 3,935,138 | 1/1976 | Wingler | 525/113 |
| 4,147,737 | 4/1979 | Sein | 525/438 |
| 4,242,253 | 12/1980 | Yallourakis | 525/113 |

FOREIGN PATENT DOCUMENTS

| | | |
|---|---|---|
| 1905825 | 10/1970 | Fed. Rep. of Germany . |
| 2127684 | 4/1973 | Fed. Rep. of Germany . |
| 2163962 | 6/1974 | Fed. Rep. of Germany . |
| 2317557 | 10/1974 | Fed. Rep. of Germany . |
| 1249271 | 10/1971 | United Kingdom . |

*Primary Examiner*—Paul Lieberman
*Attorney, Agent, or Firm*—Connolly and Hutz

[57] ABSTRACT

A powder lacquer binder composition which comprises a homogeneous crosslinkable mixture comprising: (A) a polymer containing more than one carboxyl group and having a melting and softening point of from 20° to 150° C. (as determined by differential thermoanalysis) and an acid number of from 10 to 150 mg of KOH/g; and (B) a 1,2-polyepoxide which is N,N',N''-triglycidyl triazolidine-3,5-dione having an epoxide value of from 0.6 to 1.13; the mixture containing from 0.5 to 1.5 1,2-epoxide group per carboxyl group; and a process for the preparation thereof.

7 Claims, 1 Drawing Figure

POWER LACQUER BINDERS AND PROCESS FOR THE PREPARATION THEREOF

This invention relates to powder lacquer binders of polymers containing carboxyl groups and N,N',N''-triglycidyl triazolidine-3,5-diones and to a process for the production thereof.

In the uncross-linked state, powder-form binders are formed by brittle, readily powdered resins which, in powder form, remain free-flowing and do not form lumps at temperatures of up to 60° C. After application to a substrate, the powders are required to level smoothly at temperatures of from 80° to 120° C. and to be able to be stoved at temperatures above 130° C. to form insoluble and infusible coatings. In the case of the electrostatic powder spraying process (EPS process), the powders have to be electrostatically chargeable and have to hold the electrical charge on metal articles for some time pending the stoving process. Neither should binders of the type in question undergo premature cross-linking in the vicinity of the levelling temperature, thereof, because they are generally mixed with pigments, catalysts and levelling agents in the melt at temperatures of the order of 100° C. In cases where the binders contain an external cross-linker, as in the binders according to the present invention, the component acting as cross-linker has to melt at temperatures at which the component to be cross-linked also melts and has to be compatible and homogeneously miscible with that component. On solidification of the mixture, the added cross-linker should also not affect stability in storge at temperatures of up to 50° C., nor should the system disintegrate on cooling. After levelling and stoving, the compatible mixture of cross-linker and component to be cross-linked should give a high-gloss coating which is unaffected by chemicals, solvents and weather.

The production of powder-form binders and the application thereof by various processes, for example by the EPS process, are known. Thus, binders of polymers containing carboxyl groups and triglycidyl isocyanurate and/or glycidyl esters are described in German Auslegeschrift Nos. 1,905,825; 2,163,962 and 2,127,684.

In principle, triglycidyl isocyanurate is not a stable compound because the isocyanurate ring, which may be regarded as a trimerised isocyanate, may be thermally split into the corresponding isocyanate (cf. U.S. Pat. No. 2,580,468) which may then lead to secondary reactions, resulting, for example in the yellowing of a lacquer.

Another disadvantage of the described binder systems containing triglycidyl isocyanurate lies in the fact that a level of reactivity sufficient for practical purposes may only be obtained if the carboxyl polyester has an acid number of from 60 to 100 mg of KOH/g of substance. However, within these limits to the acid number, a preliminary reaction involving both components is observed as an undesirable phenomenon during the extrusion and/or storage of the ready-to-use powder lacquers. In general, powder lacquers containing a system of this type as binder may only be stored for up to 6 months at temperatures of from 20° to 25° C. before the range of properties obtainable begin to deteriorate.

Although binder systems based on carboxyl polyesters having lower acid numbers and triglycidyl isocyanurate show distinctly improved stability in storage, they show distinctly inferior behaviour in regard to reactivity (stoving conditions) and require higher stoving temperatures and/or longer stoving times.

A similar, but even more pronounced, dependence on the acid number of the resin component is observed in the hardening of the system of carboxyl acrylates and triglycidyl isocyanurate according to German Offenlegungsschrift No. 2,202,842. In these cases, it was found that, even where the carboxyl acrylate had an acid number below 50 mg of KOH/g of substance, it was still not possible to obtain adqueate stability in storage with the result that the resin/hardener systems described in German Offenlegungsschrift No. 2,317,578 have never been adopted for practical application.

Powder lacquer binders have now been found which do not have the disadvantages of tryglycidyl isocyanurate in combination with polymers containing carboxyl groups and which may be processed by the fluidisation dip coating process, by the flame spraying process, by the EPS process or other conventional processes for applying powders. These powder lacquer binders comprise mixtures comprising polymers containing carboxyl groups and N,N',N''-triglycidyl triazolidine-3,5-diones.

Accordingly, the present invention relates to powder lacquer binders comprising homogeneous, crosslinkable mixtures comprising at least one polymer containing more than one carboxyl group and a 1,2-polyepoxide compound, characterised in that the 1,2-polyepoxide compound is an N,N',N''-triglycidyl triazolidine-3,5-dione having an epoxide value of from 0.6 to 1.13.

The 1,2-polyepoxides contained in the powder lacquer binders according to the present invention correspond to the following general formula:

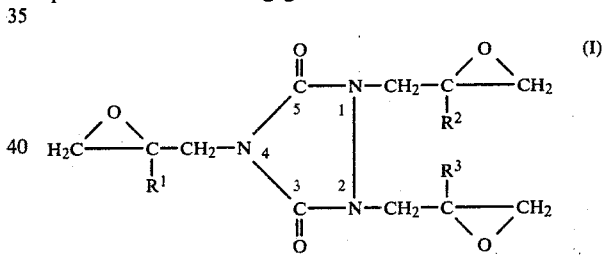

wherein $R^1$, $R^2$ and $R^3$, which may be the same or different, each represents hydrogen or methyl preferably hydrogen. They may be obtained by reacting the known triazolidine-3,5-dione corresponding to the following formula (II):

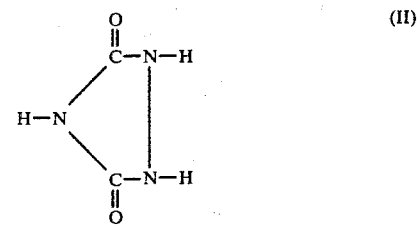

with excess epichlorohydrin or β-methyl epichlorohydrin in the presence of a suitable catalyst, for example triethyl amine in known manner at from 20° to 200° C. to form triazolidine-3,5-dione tris-chlorohydrin and treating the thus-formed chlorohydrin with hydrogen chloride acceptors, such as aqueous sodium hydroxide, at from 20° to 120° C. The N,N',N''-triglycidyl triazolidine-3,5-diones have epoxide values of from 0.6 to 1.13, preferably from 0.85 to 1.13.

The epoxide value is to be understood to be the number of gram equivalents of 1,2-epoxide groups which is contained in 100 g of substance. The epoxide equivalent is defined as the quantity of substance in grams which contains one 1,2-epoxide group. One 1,2-epoxide group is equivalent to one mole of hydrogen halide.

Pure N,N',N''-triglycidyl triazolidine-3,5-dione (Formula I, $R^1$, $R^2$ and $R^3$=hydrogen) has an epoxide value of 1.13. Lower epoxide values mean the presence of oligomeric products, i.e. products with higher molecular weights. An N,N',N''-triglycidyl triazolidine-3,5-dione having an epoxide value of 0.93 (Example 1) e.g., contains about 80% by weight of pure compound of Formula I ($R^1$, $R^2$, $R^3$=H) having a melting point of 103° to 104° C. The oligomeric products are formed during the production of N,N',N''-triglycidyl triazolidine-3,5-dione by reaction of active hydrogen atoms attached to nitrogen atoms of 1,2,4-triazolidine-3,5-dione, mono- or diglycidyl triazolidine-3,5-dione or mixtures thereof with 1,2-epoxide groups (glycidyl groups) of mono-, di- or triglycidyl triazolidine-3,5-dione or mixtures thereof and/or with the precursors of 1,2-epoxide groups, i.e. halohydrin groups. The crude 1,2,4-triglycidyl triazolidine-3,5-dione may still contain saponifiable halogen (up to about 5% by weight of chlorine and about up to 13% by weight of bromine), which, if desired, may be further reacted with a hydrogen halide acceptor. All halogen may practically be removed, whereby an increase of the epoxide value may be obtained.

The N,N',N''-triglycidyl triazolidine-3,5-diones may of course, also be mixed with other epoxide resins. The requirement which always has to be satisfied in this connection is that the powder-form coating compositions obtained after admixture with polymers containing carboxyl groups and, optionally, other additives should remain free flowing and should not form lumps and, after application to a substrate, should level smoothly before the coatings become duroplastic. Examples of epoxide resins of the type in question are: triglycidyl isocyanurate, 1,3-bis-glycidyl imidazolidine-2,4-diones, glycidyl esters of, for example, terephthalic acid, isophthalic acid or benzene tricarboxylic acids, and 1,2-epoxide resins based on bisphenols, such as 2,2-bis-(4-hydroxy phenyl)-propane or bis-(4-hydroxy phenyl)methane.

The polymers containing carboxyl groups should have a melting and softening range (DTA=differential thermoanalysis) of from 20° to 150° C., preferably from 50° to 120° C., and an acid number of from 10 to 150 mg of KOH/g of substance, preferably from 20 to 120 mg of KOH/g of substance, more particularly from 30 to 50 mg of KOH/g of substance. The OH numbers should preferably below 20, more particularly below 10.

These carboxyl group-containing polymers may be polyester polycarboxylic acids prepared from polyols and polycarboxylic acids or derivatives thereof.

The esterification reaction by which the polyester polycarboxylic acids used in accordance with the present invention are synthesised may be carried out in known manner by esterifying corresponding polycarboxylic acids and polyols, particularly dicarboxylic acids and dihydric alcohols, or by esterifying suitable derivatives of these alcohols and carboxylic acids, such as the anhydrides, and acid chlorides and also hydroxy carboxylic acids.

By incorporating polycarboxylic acids containing at least three carboxyl groups or anhydrides thereof, such as benzene-1,3,5-tricarboxylic acid or trimellitic acid anhydride, it is possible to obtain particularly preferred branched, i.e. at least tris-functional, polyester polycarboxylic acids.

However, it is also possible to use branched polyester polycarboxylic acids of the type which may be obtained by incorporating preferably aliphatic polyols containing at least three hydroxyl groups, such as trimethylol propane or glycerol.

Polycarboxylic acids suitable for preparing the polyester polycarboxylic acids used in accordance with the present invention are preferably those which correspond to the following general formula:

$$A\text{---}(COOH)_x$$

wherein A represents a single bond or an x-functional, optionally substituted aliphatic radical preferably containing from 1 to 20 carbon atoms, a cycloaliphatic radical preferably containing from 5 to 16 carbon atoms, an aliphatic-aromatic radical preferably containing from 7 to 20 carbon atoms, an aromatic radical preferably containing from 6 to 15 carbon atoms or a $C_2$-$C_{12}$ aromatic or cycloaliphatic radical containing one or more hetero-atoms, such as N, O or S, in the ring; and x of from 2 to 4, preferably 2 or 3.

Examples of such polycarboxylic acids are: oxalic acid, malonic acid, succinic acid, glutaric acid, adipic acid, trimethyl adipic acid, sebacic acid, decane dicarboxylic acid, dodecane dicarboxylic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenyl sulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid and also

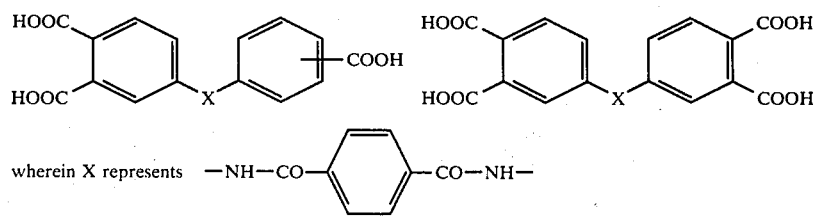

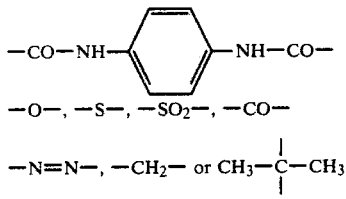

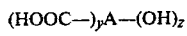

Suitable hydroxy carboxylic acids correspond to the following general formula:

$$(HOOC-)_y A-(OH)_z$$

wherein A is as defined above, and y and z each independently represents an integer of from 1 to 3, preferably 1 or 2.

Examples of such hydroxy carboxylic acids are: glycolic acid, lactic acid, mandelic acid, malic acid, citric acid, tartaric acid, 2-, 3- or 4-hydroxy benzoic acid and hydroxy benzene dicarboxylic acids.

The polyols required for preparing the polyester, polycarboxylic acids used in accordance with the present invention are, in particular, those which correspond to the following general formula:

$$B-(OH)_a$$

wherein B represents an α-functional aliphatic radical containing from 2 to 20 carbon atoms, a cycloaliphatic radical containing from 5 to 16 carbon atoms, an aliphatic radical containing from 7 to 20 carbon atoms, an aromatic radical containing from 6 to 15 carbon atoms or a $C_2$ to $C_{12}$ heterocyclic radical containing N, O or S; and a represents an integer of from 2 to 6, preferably 2 or 3.

Examples of such polyols are: ethylene glycol, 1,2-, 1,3-propane diol, 1,2- 1,3-, 1,4- and 2,3-butane diol, 1,5-pentane diol, 2,2-dimethyl-1,3-propane diol, 1,6- and 2,5-hexane diol, 1,12-dodecane diol, 1,12-octadecane diol, 2,2,4- and 2,4,4-trimethyl-1,6-hexane diol, trimethylol propane, trimethylol ethane, glycerol, 1,2,6-hexane triol, pentaerythritol, mannitol, 1,4-bis-hydroxy methyl cyclohexane, cyclohexane-1,4-diol, 2,2-bis-(4-hydroxy cyclohexyl)-propane,bis-(-b 4-hydroxy phenyl)-methane, bis-(4-hydroxy phenyl)-sulphone, 1,4-bis-hydroxy methyl benzene, 1,4-dihydroxy benzene, 2,2-bis-(4-hydroxy phenyl)-propane, 1,3-bis-hydroxy alkyl hydantoins, tris-hydroxy alkyl isocyanurates and tris-hydroxy alkyl triazolidine-3,5-diones.

Other polyols suitable for preparing the polyester polycarboxylic acids used in accordance with the present invention are the hydroxy alkyl ethers formed by the addition of optionally substituted alkylene oxides, such as ethylene oxide, propylene oxide, butylene oxide or styrene oxide, with the above-mentioned polyols and corresponding to the following general formula:

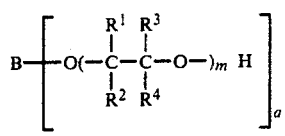

wherein B and a are as defined above; m represents an integer of from 1 to 7; and $R^1$, $R^2$, $R^3$ and $R^4$, which may be the same or different, each represents hydrogen, an optionally halogen-substituted $C_1$-$C_{10}$ aliphatic, $C_4$-$C_8$ cycloaliphatic or $C_7$-$C_{17}$ araliphatic radical or an optionally halogen- and/or alkyl and/or alkoxy-substituted $C_6$-$C_{16}$ aromatic radical.

$R^4$ represents hydrogen, a $C_1$-$C_4$ alkyl radical, preferably methyl or ethyl, or an aryl, preferably phenyl, radical optionally substituted one or more times by halogen atoms (e.g., chlorine or bromine) and/or $C_1$-$C_4$ alkyl radicals and/or $C_1$-$C_4$ alkoxy groups Examples of such polyols are: diethylene glycol, triethylene glycol, dipropylene glycol, tripropylene glycol, dibutylene glycol, 1,4-bis-[2-hydroxy ethoxy]-cyclohexane, 1,4-bis-[2-hydroxy ethoxy methane]-cyclohexane, 1,4-bis[2-hydroxy ethoxy]-benzene, 4,4'-bis-[2-hydroxy ethoxy]-diphenyl methane,-2-diphenyl propane, -diphenyl ether, -diphenyl sulphone, -diphenyl ketone and -diphenyl cyclohexane.

The carboxylic acids or carboxylic acid derivatives used and the polyols used may, of course, also be polymeric. For example, it is possible to use bis-benzene dicarboxylic acid esters corresponding to the following general formula:

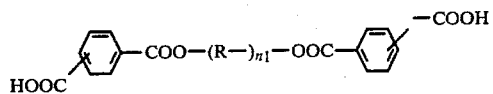

and bis-alkane dicarboxylic acid esters corresponding to the following general formula:

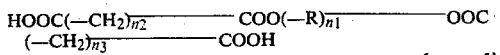

In the above formulae, R represents an at least disfunctional aromatic radical containing from 6 to 15 carbon atoms, an araliphatic radical containing from 7 to 20 carbon atoms, a saturated or unsaturated aliphatic radical containing from 2 to 20 carbon atoms, a cycloaliphatic radical containing from 5 to 15 carbon atoms which may be condensed with aromatic ($C_6$-$C_{12}$), cycloaliphatic ($C_4$-$C_{12}$) or heterocyclic ($C_2$-$C_{12}$) ring systems and attached through ether, keto, ester or sulphone bridges and which may optionally be substituted one or more times by halogen, nitro or alkoxy containing from 1 to 20 carbon atoms; $n_1$ represents an integer of from 1 to 20; and $n_2$ and $n_3$, which may be the same or different, each represents 0 or an integer of from 1 to 20.

The following are examples of $(R)_{n1}$:

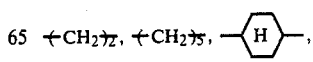

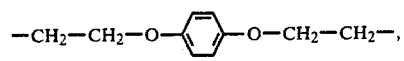

-continued

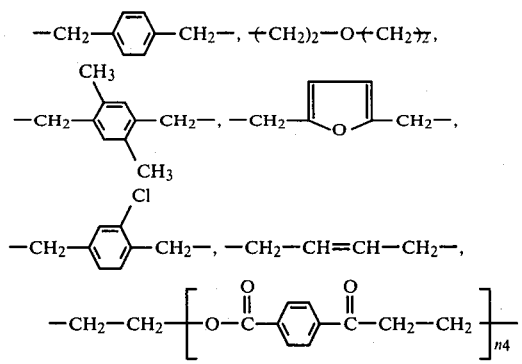

wherein $n_4$ represents an integer of from 1 to 7

These polyester polycarboxylic acids are generally prepared in known manner by melting the polycarboxylic acids and polyols together and removing the water liberated, optionally by applying vacuum or by means of a stream of nitrogen. The course of the reaction may be followed by titrating the excess carboxyl groups so that the end of the reaction may readily be detected.

It is, of course, also possible to react polyesters containing hydroxyl groups obtained in known manner from polycarboxylic acids, anhydrides, acid chlorides and/or alkyl esters and polyols, with polycarboxylic acids and polycarboxylic acid anhydrides to form the polyester polycarboxylic acids used in accordance with the present invention. It is, of course, also possible to react polyesters containing hydroxyl groups of the type in question with low molecular weight acid polyesters, i.e. polyesters containing carboxyl groups, to form the polyester polycarboxylic acids used in accordance with the present invention.

In cases where branched polyester polycarboxylic acids are required, they may be obtained by condensing all components containing an at least trifunctional alcohol or an at least trifunctional polycarboxylic acid in the melt by the methods described above to form a branched polyester.

However, the at least trifunctional polyol may also be reacted together with the dicarboxylic acids or derivatives thereof to form a polyester containing short-chain carboxyl groups or derivatives thereof which is then condensed with further diols and dicarboxylic acids to form the polyester polycarboxylic acids used in accordance with the present invention.

It is of course, also possible to react an at least trifunctional polycarboxylic acid with diols to form a branched short-chain polyester containing hydroxyl groups which is then further reacted with other diols and dicarboxylic acids to form the polyester polycarboxylic acids used in accordance with the present invention.

Branched polyester polycarboxylic acids may, of course, also be obtained by reacting at least trifunctional polycarboxylic acids of the type in question with the hydroxyl group-containing polyesters described above.

Another group of polymers containing carboxyl groups are the carboxyl group-containing copolymers which comprise copolymerised units of from 2 to 25%, by weight, of at least one copolymerisable $\alpha,\beta$-ethylenically unsaturated carboxylic acid containing from 3 to 5 carbon atoms and from 75 to 98%, by weight, of at least one other copolymerisable monomer. The $\alpha,\beta$-ethylenically unsaturated carboxylic acids may be mono- or di-carboxylic acids or semi-esters of dicarboxylic acids containing from 1 to 12 carbon atoms in the alcohol component.

The following are mentioned as examples of copolymerisable monomers:

(I) Esters of acrylic or methacrylic acid with $C_1$-$C_{12}$ aliphatic, $C_5$ or $C_6$ cycloaliphatic, $C_7$ or $C_8$ araliphatic mono-hydric alcohols, e.g., methyl acrylate, ethyl acrylate, n-propyl acrylate, isopropyl acrylate, n-butyl acrylate, t-butyl acrylate, 2-methyl hexyl acrylate, 2-ethyl hexyl acrylate, dodecyl acrylate and the corresponding methacrylic acid esters and maleic acid diesters; cyclopentyl acrylate, cyclohexyl acrylate or the corresponding methacrylic acid esters and maleic acid diesters; benzyl acrylate, $\beta$-phenyl ethyl acrylate, corresponding methacrylic acid esters and maleic acid diesters;

(II) aromatic vinyl and vinylidene compounds, for example styrene, $\alpha$-methyl-p-isopropyl styrene, $\alpha$-methyl-m-isopropyl styrene, o- or p-chlorostyrene, o- or p-bromostyrene, nucleus-substituted methyl styrene, p-t-butyl styrene or mixtures thereof;

(III) vinyl esters of organic mono carboxylic acids, the acid component containing from 2 to 4 carbon atoms, such as vinyl acetate and vinyl propionate;

(IV) mono-olefinically unsaturated halogenated hydrocarbons, such as vinyl chloride or vinylidene chloride, preferably vinyl chloride;

(V) acrylonitrile, methacrylonitrile, acrylamide or methacrylamide;

(VI) vinyl alkyl ethers containing from 1 to 4 carbon atoms in the alkyl group, such as vinyl methyl ether, vinyl ethyl ether, vinyl propyl ether or vinyl butyl ether.

Preferred copolymers containing carboxyl groups comprise polymerised units of (a) from 0 to 60%, by weight, of styrene, $\alpha$-methyl styrene, o- or p-chlorostyrene, o- or p-bromostyrene, p-t-butyl styrene or mixtures thereof, preferably styrene;

(b) from 0 to 98%, by weight, of acrylic acid esters with aliphatic $C_1$-$C_8$ alcohol radicals or methacrylic acid esters with aliphatic $C_1$-$C_8$ alcohol radicals or mixtures thereof;

(c) from 2 to 25%, by weight, of acrylic acid, methacrylic acid, itaconic acid, maleic acid and fumaric acid semi-esters containing from 1 to 8 carbon atoms in the alcohol component or mixtures thereof, preferably acrylic acid and/or methacrylic acid; (the sum of the percentages of (a) to (c) amounting to 100).

Instead of (c), the copolymer may even contain from 2 to 25% by weight of one or more olefinically unsaturated copolymerisable monomers containing at least one hydroxyl group, such as hydroxy alkyl esters of acrylic, methacrylic, maleic, fumaric or itaconic acid, containing from 2 to 4 carbon atoms in the alkyl radical.

In cases where the monomers containing hydroxyl groups are used, copolymers containing hydroxyl groups are obtained and may be converted into copolymers containing carboxyl groups by reaction with carboxylic acid anhydrides, such as succinic acid anhydride.

In the context of the present invention, copolymers are to be understood to be not only copolymers in which the copolymerised monomers are statistically distributed or block copolymers, but also graft copolymers in which monomers have been grafted on to a pre-formed homo- or co-polymer. Statistical-copolymers are preferred.

The copolymers containing carboxyl groups used in accordance with the present invention are produced by known methods of bulk, solution, dispersion and bead polymerisation, preferably by solution or bulk polymerisation. Methods of this type are described, for example, in Methoden der Organischen Chemie, Houben-Weyl, 4th Edition, Vol. 14/1, pages 24 to 556 (1961) and in German Offenlegungsschrift Nos. 2,600,318 and 1,965,740.

Where polymerisation is carried out in solution, the solvent used may be selected, inter alia, from methylene chloride, ethanol, isopropanol, n-propanol, n-butanol, isobutanol, t-butanol, acetic acid methyl to butyl ester, acetone, methyl ethyl ketone, benzene or toluene.

The polymerisation reactions may be carried out at temperatures of from 40° to about 180° C.

Suitable initiators are, for example, percarbonates, peresters, such as t-butyl perpivalate, peroctoate, benzoyl peroxide, o-methoxy benzoyl peroxide, dichlorobenzoyl peroxide or azodiisobutyrodinitrile, generally used in quantities of from 0.5 to 3%, by weight, based on monomer.

In addition, it is possible to use conventional molecular weight regulators, such as thioglycol, thioglycerol or t-dodecyl mercaptan.

The copolymer solution is freed from the solvent in suitable apparatus, for example evaporator screws, at temperatures of from about 90° to 180° C., for example by the process according to German Offenlegungsschrift No. 2,005,691, cooled, granulated and ground. However, isolation may also be carried out by other processes, for example by spray drying, removing the solvent with steam accompanied by dispersion in water or, in accordance with German Offenlegungsschrift No. 2,008,711, by precipitation with water from a water-miscible solvent.

Where polymerisation is carried out in bulk, volatile constituents (in particular, catalyst decomposition products and monomer impurities) may be continuously or periodically removed in vacuo on completion of polymerisation. The volatile constituents may again be removed by thin-film evaporation.

The polymers containing carboxyl groups used in accordance with the present invention should have an acid number of from 10 to 150 mg of KOH/g of substance, preferably from 20 to 120 mg of KOH/g of substance, more particularly from 30 to 50 mg of KOH/g of substance.

Where no importance is attributed to relatively high reactivity, the acid number of the polymers may be reduced which could result in an increase in the stoving temperature.

The polymers containing carboxyl groups should be resins which are readily capable of being powdered at room temperature and which have a softening or melting range (DTA) of from 20 to 150° C., preferably from 50 to 120° C.

The polymers containing carboxyl groups and the N,N',N"-triglycidyl triazolidine-3,5-diones are used in such quantitative ratios that there are from 0.5 to 1.5 moles, preferably from 0.9 to 1.1 moles, of epoxide groups per carboxyl group. In certain cases, however, the quantitative ratios may even be higher or lower.

Auxiliaries and additives, such as catalysts, may be added to the binders according to the present invention in suitable quantities (e.g., from 0.01 to 5%, by weight, based on binder) to accelerate the stoving process. Such known auxiliaries and additives are basically-reacting chemical compounds which according to type, bring about the actual reaction of the epoxidic component or merely function as activators. Suitable catalysts are: tertiary amines, ammonium salts, for example tetrabutyl ammonium iodide, sulphonium salts, Lewis acids, such as boron trifluoride adducts, or oil-soluble metal compounds, such as dibutyl tin dioctoate.

Other suitable additives are inert fillers and heat-stable organic or inorganic pigments which may be used in the conventional quantities of up to 150%, by weight, based on binder.

Examples of suitable pigments are titanium dioxide, iron oxides, chromium oxide, phthalocyanine and azo pigments.

In most cases, it is advisable to use as further auxiliaries and additives known levelling agents, such as commercial butyl acrylate oligomers, commercial silicone oils and/or mixtures thereof with acrylate resins characterised by suitable melting and flow properties, commercial surfactants (commercial perfluorine compounds and known fatty alcohol sulphonates) or other resins characterised by suitable flow and melting properties and by a suitable effect on the surface tension of the binders according to the present invention. The levelling agents may be used in quantities of from 0.1 to 5% by weight, based on binder.

It is also occasionally advisable to add to the binder suitable quantities of substances which act as so-called "deaerators". Benzoin, for example, is known to act as a deaerator.

In addition, it may be useful in some cases to add so-called "quenchers" to improve the weather resistance of the coatings. Known quenchers include commercial salts of quaternary amines or tertiary amines similar to 2,2, 6,6-tetramethyl piperidine.

The coating powders are normally produced by drymixing the binder, consisting of an N,N',N"-triglycidyl triazolidine-3,5-dione and polymers containing carboxyl groups, with organic or inorganic pigments, optionally with a catalyst, levelling agents and/or auxiliaries in commercial mixers.

This starting mixture, also known as a dry blend or premix, may only rarely be used as a coating powder. In general, the pigment is dispersed by extrusion or similar dispersion.

To this end, the starting mixture may be homogenised in the conventional way in a conventional extruder over a period of from 0.5 to 3 minutes at a temperature of from 70° to 140° C., preferably from 100° to 120° C. The extrudate which has hardened, optionally after accelerated cooling, is first suitably rough ground and then subjected to fine grinding in known manner in a pinned-disc mill or blowing mill to an average particle size of from 20 to 500 μm, preferably from 35 to 60 μm. If necessary, certain fractions may even be sieved out or classified by air separation.

Depending on the grain size distribution selected, the thus-produced coating powder may be sprayed by the EPS process onto a metallic or conductive substrate and subsequently stoved for hardening, for example for 30 minutes at 160° C. or for from 5 to 10 minutes at 200° C., or may be processed in known manner by fluidisation dip coating or by flame spraying.

The coating powders may be applied to suitable substrates, particularly metals, in known manner by dip coating or spray coating processes such as fluidisation dip coating or flame spraying, or preferably by electrostatic powder spraying (40–90 kV); cf. D. R. Davis, "Coating With Electrostatic Dreyspray", in Plastics Technology, June 1962, pages 37 to 38.

Electrostatic processing, for example, gives coatings having a layer thickness of from 25 to 300 μm, preferably from 40 to 80 μm which are characterised by excellent gloss, extreme hardness and elasticity, particularly shock elasticity, and which show outstanding gloss retention and resistance to chalking in the open air.

It must be regarded as extremely surprising that the coatings produced using the binders according to the present invention have outstanding gloss extreme hardness and elasticity, particularly shock elasticity, and show excellent gloss retention and resistance to chalking in the open air despite the fact that N,N',N''-triglycidyl triazolidine-3,5-dione contains a non-aromatic heterocycle with an N-N bond which experience has shown to be unstable and to break very easily, particularly under thermal stressing.

Nevertheless, N,N',N''-triglycidyl triazolidine-3,5-diones show better thermal stability than triglycidyl isocyanurate and lead to white coatings which show distinctly more favourable whiteness according to Berger than coatings produced using triglycidyl isocyanurate, even when carboxy functional polyesters are used as the resin component.

This is very surprising because it had been assumed that the N-N-structure in the N,N', N''-triglycidyl triazolidine-3,5-diones would be at least partly split under the stoving conditions, resulting in the formation of yellowed lacquer films.

Another advantage of the binders according to the present invention lies in the improved storability of the coating powders produced therefrom so that they may even be used in sub-tropical and tropical climates. In spite of this, the stoving conditions are made no less favourable because N,N',N''-triglycidyl triazolidine-3,5-diones show a balanced ratio between reactivity and storability for polymers containing carboxyl groups. In addition, a distinct improvement in shock elasticity and in the levelling of the coatings is obtained using N,N',N''-triglycidyl triazolidine 3,5-diones.

The powders can be used for coating domestic appliances, above all metal parts, metal parts in car manufacture, metal parts exposed to the effect of weather, such as facing panels, pipes, wire nets, machinery for use in forestry and agriculture, bicycle and motor cycle frames, building and installation elements, housings for fluorescent tubes and lighting installations.

The coatings serve primarily to prevent corrosion and mechanical wear on objects of metals, such as steel, cast steel, copper, brass, bronze, gunmetal, aluminium and alloys thereof, galvanised substrates, and also on objects of porcelain, ceramics, plastics and even certain types of wood. They may also be used as electrically insulating coatings in the electrical field, for example for lights, switches or motor components. Using the fluidisation dip coating process, it is possible for example, to coat domestic appliances, refrigerator shelves, hallstands, decorative objects, self-service baskets and bottle baskets or pipes. The flame spraying process and electrostatic powder coating process are preferably used for coating larger surfaces of the above-mentioned materials. They are used, for example, for the external and internal coating of pipes or containers. By virtue of the outstanding levelling properties thereof, the binders are preferably used in the lacquering of car accessories.

The parts and percentages quoted in the Examples are based on weight, unless otherwise indicated.

Preparation of
N,N',N''-triglycidyl-triazolidine-3,5-dione

In a 4-liter three-necked flask equipped with a stirrer, thermometer and reflux condenser, 101 g (1 mole) of triazolidine-3,5-dione, 2775 g (30 moles) of epichlorohydrin and 2 ml of triethylamine are heated to 80° C. by means of an oil bath. The mixture reacts exothermically so that the oil bath may be removed. After the exothermic reaction has abated, the reaction mixture is stirred at 80° C. The total reaction time is 10 hours at 80° C. 250 g of 50% sodium hydroxide solution are added dropwise to the solution obtained over a period of 4 hours at from 30° to 40° C. in such a way that the water added and the water formed during the reaction is continuously removed by azeotropic distillation from 30 to 60 Torr using a water separator. To complete the reaction, the reaction mixture is stirred for another hour and the sodium chloride formed is separated off by filtration. The sodium chloride is washed twice with 200 g of epichlorohydrin and the combined epichlorohydrin solutions are washed out with 200 ml of water. After the organic phase has been dried over sodium sulphate, the solvent is removed by concentration in a rotary evaporator and the residue is dried, ultimately at 80° C./0.2 mbar, to constant weight. 240 g of a light brown viscous oil are obtained. It was found to have an epoxide value of 0.93 and a chlorine content of 2.75% (total chlorine). The viscous oil crystallises after standing for from a few hours to a few days. The practically pure N,N',N''-triglycidyl triazolidine-3,5-dione melting at from 98° to 103° C. recrystallizes out by dissolution in methanol and cooling to 5° C. IR- and NMR-spectra in conjunction with elemental analysis and epoxide determination confirm the assumed structure.

Calculated: C=49.1% H=5.57% N=15.6% Observed: C=49.0% H=5.6% N=15.5%

Calculated: epoxide value=1.13 Observed: epoxide value=1.10

If from 3 to 30 moles of epichlorohydrin are used per mole of triazolidine-3,5-dione and if the reaction mixture is further processed in the same way as described above, the epoxide values of the N,N',N''-triglycidyl triazolidine-3,5-dione obtained, which in parts is more highly condensed, may amount to from 0.6 to 1.0 and the chloride contents to from 0 to 3%, by weight.

EXAMPLE 1

62.57 parts, by weight, of a polyester resin having a melting or softening point of 73° C. (DTA), an acid number (AN) of 40 (DIN 53 402) and an OH number of from 8 to 9 (DIN 53 240), which has been obtained from terephthalic acid (68.64 parts, by weight), isophthalic acid (10.27 parts, by weight), neopentyl glycol (22.29 parts, by weight), ethylene glycol (13.29 parts, by weight) and glycerol (2.29 parts, by weight) by melt condensation with elimination of water, are dry mixed with 4.13 parts, by weight, of N,N',N''-triglycidyl triazolidine-3,5-dione (epoxide value 1.1), 32.8 parts, by weight, of commercial titanium dioxide pigment (rutile) and 0.5 parts, by weight, of a levelling agent (a copolymer of 70%, by weight, of 2-ethyl hexyl acrylate units and 30%, by weight, of ethyl acrylate units).

This starting mixture is homogenised in a conventional extruder at a temperature of 100° C. The extrudate which hardens after cooling is first suitably rough ground and then reduced to an average grain size of from 30 to 60 μm in a pinned disc mill or blowing mill and electrostatically applied under a negative voltage of 90 kV to iron plates of suitable size and thickness which have been pre-treated in the conventional way with zinc phosphate.

Stoving for 10 minutes at 200° C. produced coatings having an average thickness of 60 μm which are characterised by outstanding gloss, extreme hardness and elasticity, and which show outstanding gloss retention and resistance to chalking in the open air.

EXAMPLE 2

62.57 parts, by weight, of a polyester resin which has been obtained by melt condensation from terephthalic acid (67.34 parts, by weight), isophthalic acid (10.15 parts, by weight), neopentyl glycol (22.07 parts, by weight), ethylene glycol (13.15 parts, by weight) and trimethylol propane (3.29 parts, by weight) and which has a melting and softening point of from 69° to 75° C. (DTA), an acid number of 40 (DIN 53 402) and an OH number of from 8 to 9 (DIN 53420) are mixed with 4.13 parts, by weight of N,N',N''-triglycidyl triazolidine-3,5-dione (epoxide value 1.1) and with the same additives as in Example 1 and the resulting mixture processed, as in Example 1, to form a coating powder. Application by electrostatic spraying under a negative voltage of 90 kV gives coatings having average layer thicknesses of 60 μm which combine a high degree of whiteness (according to Berger) with outstanding adhesion and high elongation and elasticity.

A short-term test in an Atlas weatherometer (sunshine XW type, cycle 17:3 corresponding to ASTM E 42-64 type E), a salt spray test and a tropical test reveal excellent gloss retention and resistance to chalking in the open air coupled with excellent corrosion-inhibiting properties and long term bond strength.

EXAMPLE 3

63.5 parts, by weight, of a polyester which has been produced from terephthalic acid (58.5 parts, by weight), isophthalic acid (14.0 parts by weight), trimellitic acid (1.5 parts, by weight), neopentyl glycol (33.8 parts, by weight), ethylene glycol (3.7 parts, by weight) and 1,6-hexane diol (4.6 parts, by weight) and which has a melting and softening point of 66° C. (DTA), an acid number of 30 (DIN 53402) and an OH number of approximately 6 (DIN 53420) are dry mixed with 3.2 parts, by weight, of N,N',N''-triglycidyl triazolidine-3,5-dione (epoxide value 1.1), 32.8 parts, by weight, of a titanium dioxide pigment (rutile) and 0.5 parts, by weight, of the levelling agent according to Example 1. If neither the resin nor the hardener are supplied ready for use, they are preground in a cross beater mill to a particle size of the order of 1 mm³.

Following the procedure of Example 2, the mixture (dry blend, premix) was extruded, ground and sieved or classified and then electrostatically applied under a negative voltage of 90 kV to iron plates of suitable size and thickness which had been pre-treated in the conventional way with zinc phosphate.

Stoving for 10 minutes at 200° C. produced coatings having an average thickness of 60 μm which combined high gloss and good elongation and elasticity with excellent adhesion to the substrate.

The values obtained in a short-term weatherometer test indicate good gloss retention and resistance to chalking in the open air.

EXAMPLE 4

61.8 parts, by weight, of a polyester polycarboxylic acid which has been obtained by melt condensation from terephthalic acid (56.5 parts, by weight), isophthalic acid (10.0 parts, by weight), neopentyl glycol (38.3 parts, by weight) and 1,4-dimethylol cyclohexane (3.8 parts, by weight) and which has a melting and softening point of 71° C. (DTA), an acid number of approximately 50 (DIN 53402) and an OH number of from 4 to 5 (DIN 53240) are processed with 4.9 parts, by weight, of N,N',N''-triglycidyl triazolidine-3,5-dione (epoxide value 1.1) and with quantitatively the same additions and in the same way as in Example 3 to form an EPS powder coating material which is then sprayed under negative voltage of 90 kV onto aluminium test plates of suitable size and thickness which have been pre-treated in the conventional way by green or yellow chromating, followed by stoving for 15 minutes at 180° C.

The coatings obtained have an average thickness of 60 μm and largely correspond in the properties thereof to the coatings obtained in accordance with Example 3.

EXAMPLE 5

63.5 parts, by weight, of a polyester which has a melting and softening point of 72° C. (DTA), an acid number of approximately 32 (DIN 53402) and an OH number of approximately 2 (DIN 53240) and which has been obtained from terephthalic acid (62.8 parts, by weight), isophthalic acid (9.4 parts, by weight) and neopentyl glycol (42.6 parts, by weight) are mixed with 3.2 parts, by weight, of N,N',N''-triglycidyl triazolidine-3,5-dione (epoxide value 1.1) and with the same additives as in Example 3, the resulting mixture is processed in the same way to form a coating powder and the thus-obtained coating powder is applied to iron plates under the same conditions as in Example 4, followed by stoving for 10 minutes at 200° C. The lacquered plates were substantially identical in the properties thereof with the lacquered plates of Example 4.

EXAMPLE 6

The procedure was as in Example 5, except that grinding was carried out in such a way that the coating powder had a particle size of from 80 to 400 μm. Test specimens of solid iron which had been pre-treated in the conventional way were pre-heated to 250° C., immersed in a fluidised bed filled with the coating powder according to this Example and subsequently afterheated for 15 minutes at 200° C. to guarantee satisfactory conversion into the duroplastic state.

Smooth coatings have an average thickness of 500 μm were obtained, but could not be tested for the expected excellent mechanical properties on account of the nature of the test specimens.

EXAMPLE 7

55.9 parts, by weight, of a copolymer of copolymerised units of 48%, by weight, of styrene, 37%, by weight, of butyl acrylate and 15%, by weight, of acrylic acid obtained in accordance with German Auslegeschrift No. 2,304,847, which has an acid number of approximately 100 (DIN 53402) and a melting and softening point of 60° C. (DTA), were mixed with 4.7 parts, by weight of N,N',N''-triglycidyl triazolidine-3,5-dione (epoxide value 1.1) and the same additives as in Example 1 and the resulting mixture was sprayed onto the above-described iron plates and stoved for 35 minutes at 170° C. Coatings combining a high degree of whiteness (according to Berger) with satisfactory elasticity were obtained. A short-term weatherometer test indicated satisfactory chalking and weather resistance.

EXAMPLE 8

63.6 parts, by weight, of a copolymer which had been produced by bulk copolymerisation in UV light by the process according to German Offenlegungsschrift No. 2,600,318 and which consisted of copolymerised units of 30%, by weight, of styrene 41% by weight, of methyl methacrylate, 25%, by weight, of butyl acrylate and 4%, by weight, of acrylic acid (melting and softening point from approximately 40 to 50% C. (DTA): acid number approximately 30 (DIN 53402)) were mixed with 3.6 parts, by weight, of N,N',N''-triglycidyl triazolidine-3,5-dione (epoxide value 0.95) and the same additives as in Example 1 and the resulting mixture sprayed onto iron plates. Stoving for 15 minutes at 180° C. gave coatings having an average layer thickness of 60 μm and an excellent degree of whiteness (according to Berger). These coatings showed good elasticity.

A short-term weatherometer test indicated outstanding gloss retention and chalking resistance.

EXAMPLE 9

63.6 parts, by weight, of a copolymer of copolymerised units of 30%, by weight, of styrene, 36%, by weight, of methyl methacrylate, 30%, by weight, of butyl acrylate, and 4%, by weight, of acrylic acid, which has a melting point and softening point of from approximately 40° to 50° C. (DTA) and an acid number of approximately 30 (DIN 53402), were mixed with 3.1 parts by weight, N,N',N''-triglycidyl triazolidine-3,5-dione (epoxide value 1.1) and with the same additives as in Example 1, the resulting mixture was processed to form a coating powder in accordance with Example 1 and the thus-obtained coating powder was applied by spraying. Stoving for 15 minutes at 180° C. produced coatings having an average layer thickness of from 40 to 60 μm and an excellent degree of whiteness (according to Berger). The coatings showed good elasticity. A short-term weatherometer test indicated outstanding gloss retention and resistance to chalking.

By virtue of the almost complete resistance to hydrolysis theeof, the coatings obtained in accordance with Examples 7 to 9 also show outstanding resistance to chemical agents particularly domestic chemicals, and are highly resistant to detergent solutions, boiling water and solvents.

The coatings according to Examples 1 to 9 show excellent corrosion-inhibiting properties without under-film corrosion, as shown by the results of the salt spray test (DIN/53167/50021), the tropical test (DIN 50017) and the Kesternich test (DIN 50018).

COMPARISON TEST a. 94 parts of a polyester obtained from terephthalic acid (62.8 parts), isophthalic acid (9.4 parts), and neopentyl glycol (42.6 parts) by melt condensation with elimination of water are dry mixed with 6 parts of N,N',N''-triglycidyl triazolidine-3,5-dione (epoxide value 1.1) and the additives, as given in Example 1, and the resulting mixture is processed again as in Example 1 to form a coating powder.

b. Test a. is exactly repeated, with the exception, that 6 parts of N,N',N''-triglycidyl triazolidine-3,5-dione are replaced by 7 parts of triglycidyl isocyanurate.

The powders of tests a. and b. are electrostatically applied under a negative voltage of 90 kV to iron plates, as in Example 1. Stoving for 10 min. at 200° C. produce coatings having an average thickness of 60 μm. The gloss retention was tested in an Atlas weatherometer (Type Sunshine XW, cycle 17:3). The several gloss values, determined according to Gardner (∠ 20° and 60°), ASTM D-523-53-T, were plotted against the time in hours (h). The following diagram (FIG. 1) clearly demonstrates that the gloss retention of a film according to the invention (Test a.)=graph (a) is higher than that of a film obtained according to Test b. (graph b) during the whole period of the test, is effected by the higher stability of the film crosslinked with N,N',N''-triglycidyl triazolidine-3,5-dione.

We claim:

1. A powder lacquer binder composition which comprises a homogenous, cross-linkable mixture comprising:
   (A) A polymer containing more than one carboxyl group and having a melting and softening point of from 20° to 150° C. (as determined by differential thermoanalysis) and an acid number of from 10 to 150 mg of KOH/g; and
   (B) a 1,2-polyepoxide which is an N,N',N''-triglycidyl triazolidine-3,5-dione having an epoxide value of from 0.6 to 1.13;
   the mixture containing from 0.5 to 1.5 1,2-epoxide group per carboxyl group.

2. A composition as claimed in claim 1 comprising, as the 1,2-polyepoxide (b), a N,N',N''-triglycidyl triazolidine-3,5-dione corresponding to the following general formula:

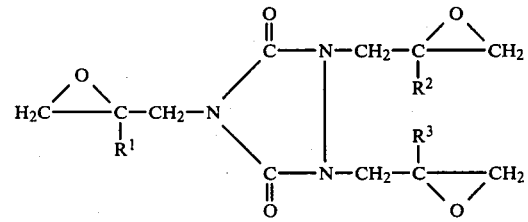

wherein
R¹, R² and R³, which may be the same or different, each represents hydrogen or methyl.

3. A composition as claimed in claim 1 comprising, as the polymer (A), a polyester or a copolymer of monodefinically unsaturated monomers.

4. A process for the production of a composition as claimed in claim 1 which comprises mixing (A) and (B) so that the mixture contains from 0.5 to 1.5 1,2-epoxide group per carboxyl group.

5. A process as claimed in claim 4, in which (A) and (B) and, optionally (C) one or more auxiliaries or additives, are homogenised in an extruder at from 70° to 140° C. and the solidified, fusible, uncross-linked extrudate is ground to an average particle size of from 20 to 500 μm.

6. A process for the production of a coated substrate which comprises applying to a substrate a composition as claimed in claim 1.

7. A substrate which has applied thereto a coating comprising a composition as claimed in claim 1.

* * * * *